(12) United States Patent
Sakai

(10) Patent No.: US 9,278,393 B2
(45) Date of Patent: Mar. 8, 2016

(54) CUTTING INSERT, CUTTING TOOL, AND METHOD OF MANUFACTURING MACHINED PRODUCT USING THE SAME

(75) Inventor: Kouhei Sakai, Kyoto (JP)

(73) Assignee: Kyocera Corporation, Kyoto (JP)

( * ) Notice: Subject to any disclaimer, the term of this patent is extended or adjusted under 35 U.S.C. 154(b) by 347 days.

(21) Appl. No.: 13/882,624

(22) PCT Filed: Sep. 30, 2011

(86) PCT No.: PCT/JP2011/072532
§ 371 (c)(1),
(2), (4) Date: Apr. 30, 2013

(87) PCT Pub. No.: WO2012/060173
PCT Pub. Date: May 10, 2012

(65) Prior Publication Data
US 2013/0213196 A1 Aug. 22, 2013

(30) Foreign Application Priority Data

Nov. 4, 2010 (JP) ................................. 2010-247558
Nov. 4, 2010 (JP) ................................. 2010-247559

(51) Int. Cl.
*B23B 27/22* (2006.01)
*B23B 27/04* (2006.01)

(52) U.S. Cl.
CPC ............... *B23B 27/22* (2013.01); *B23B 27/045* (2013.01); *B23B 2200/081* (2013.01); *B23B 2200/28* (2013.01); *B23B 2200/286* (2013.01); *B23B 2200/321* (2013.01); *Y10T 82/10* (2015.01); *Y10T 407/245* (2015.01)

(58) Field of Classification Search
CPC .. B23B 27/04; B23B 27/045; B23B 2200/08; B23B 2200/081; B23B 2200/32; B23B 2200/321; B23B 2210/06; B23B 2270/00; B23B 2270/54; Y10T 407/235; Y10T 407/23; Y10T 407/25; Y10T 407/24; Y10T 407/245
USPC ............ 82/1.11; 407/113, 114, 115, 116, 117
See application file for complete search history.

(56) References Cited

U.S. PATENT DOCUMENTS

| 5,342,151 A | 8/1994 | Friedmann |
| D416,917 S * | 11/1999 | Xie et al. ..................... D15/139 |

(Continued)

FOREIGN PATENT DOCUMENTS

| CN | 1315890 | 10/2001 |
| EP | 2446990 | 5/2012 |

(Continued)

OTHER PUBLICATIONS

International Search Report, PCT/JP2011/072532, Nov. 1, 2011, 2 pp.

*Primary Examiner* — Sunil K Singh
*Assistant Examiner* — Alan Snyder
(74) *Attorney, Agent, or Firm* — Volpe and Koenig, P.C.

(57) ABSTRACT

A cutting insert includes an insert body including an upper surface, a lower surface, a side surface connected to each of the upper surface and the lower surface, and a cutting edge located at an intersection of the upper and side surfaces. The insert body is divided into cutting and fixing sections. A region of the upper surface located at the cutting section includes a rake surface which is located further inward than the cutting edge and is inclined as going inward at an inclination angle α1 with respect to a reference plane perpendicular to a central axis, and a plurality of protruded parts arranged along the cutting edge. Each of the plurality of protruded parts includes a first surface which is inclined as going inward at an inclination angle with respect to the reference plane and has a larger width as going inward in a top view.

20 Claims, 8 Drawing Sheets

(56) References Cited

U.S. PATENT DOCUMENTS

| | | | |
|---|---|---|---|
| 7,458,753 B1* | 12/2008 | Niebauer et al. | 407/113 |
| 2003/0170081 A1 | 9/2003 | Andersson et al. | |
| 2005/0254909 A1* | 11/2005 | Krahula et al. | 407/114 |
| 2009/0226269 A1* | 9/2009 | Iyori et al. | 407/114 |
| 2010/0061815 A1 | 3/2010 | Inoue | |
| 2010/0067992 A1* | 3/2010 | Uchijo et al. | 407/100 |
| 2012/0087751 A1* | 4/2012 | Yamaguchi | 407/115 |

FOREIGN PATENT DOCUMENTS

| | | |
|---|---|---|
| JP | 55037205 A | 3/1980 |
| JP | 05253709 A | 10/1993 |
| JP | 11077409 | 3/1999 |
| JP | 2000126908 A | 5/2000 |
| JP | 2005515905 A | 6/2005 |
| JP | 2008117822 A1 | 10/2008 |
| WO | 0013824 | 3/2000 |
| WO | 2008117822 | 10/2008 |

* cited by examiner

CUTTING INSERT, CUTTING TOOL, AND METHOD OF MANUFACTURING MACHINED PRODUCT USING THE SAME

FIELD OF INVENTION

The present invention relates to a cutting insert, a cutting tool, and a method of manufacturing a machined product using the same.

BACKGROUND

In cutting inserts for grooving process and copying process (hereinafter referred to as "inserts" in some cases), various considerations about the shape of a rake surface of the insert have conventionally been made, for example, in order to smoothly discharge generated chips (for example, refer to Japanese Unexamined Patent Publication No. 5-253709).

However, in the insert described in Japanese Unexamined Patent Publication No. 5-253709, as shown in FIG. 5, a protruded part 11 as a connection part between adjacent recessed parts 8 has a relatively large width in the vicinity of a cutting edge 6, and the width thereof is kept constant or decreased as the protruded part 11 goes inward from the vicinity of the cutting edge 6. Accordingly, there is a risk that cutting resistance during cutting is increased by the wide protruded part 11 in the vicinity of the cutting edge 6, thus failing to smoothly discharge the chips.

Also in the insert described in Japanese Unexamined Patent Publication No. 5-253709, as shown in FIGS. 5 and 9, the recessed parts 8 and a protrusion 10 are smoothly continuous with each other as going inward from the cutting edge 6. Thus, for example, there is a risk that the chips generated by the cutting edge 6 cannot smoothly be discharged.

Hence, there is a need to improve discharge performance for the chips generated by the cutting edge.

SUMMARY

An object of the present invention is to provide a cutting insert and a cutting tool which have excellent chip discharge performance, as well as a method of manufacturing a machined product using the cutting tool.

A cutting insert according to an embodiment of the present invention includes an insert body including an upper surface, a lower surface, a side surface connected to each of the upper surface and the lower surface, and a cutting edge located at an intersection of the upper surface and the side surface. The insert body is divided into a cutting section and a fixing section. A region of the upper surface located at the cutting section includes a rake surface which is located further inward than the cutting edge and is inclined as going inward at an inclination angle $\alpha 1$ with respect to a reference plane perpendicular to a central axis extending between the upper surface and the lower surface, and a plurality of protruded parts arranged along the cutting edge. Each of the plurality of protruded parts includes a first surface which is inclined as going inward at an inclination angle $\alpha 4a$ with respect to the reference plane and has a larger width as going inward in a top view. The inclination angles $\alpha 1$ and $\alpha 4a$ satisfy a relationship of $\alpha 1 > \alpha 4a$.

A cutting tool according to an embodiment of the present invention includes the foregoing cutting insert, and a holder configured to attach the cutting insert to a front end thereof.

A method of manufacturing a machined product according to an embodiment of the present invention includes rotating a workpiece; bringing the workpiece being rotated and the cutting edge of the cutting tool according to the foregoing embodiment into contact with each other; and separating the workpiece and the cutting tool from each other.

In the cutting insert according to the embodiment of the present invention, as described above, each of the plurality of protruded parts includes the first surface which is inclined as going inward at the inclination angle $\alpha 4a$ with respect to the reference plane and has the larger width as going inward in the top view. The inclination angles $\alpha 1$ and $\alpha 4a$ satisfy the relationship of $\alpha 1 > \alpha 4a$. Hence, chips can be hardened and effectively discharged by a wide part of each of the protruded parts as the chip generation proceeds, while reducing the cutting resistance when the cutting edge is contacted against a workpiece and chips are generated.

DETAILED DESCRIPTION OF THE PREFERRED EMBODIMENTS

<Cutting Insert>

Figure 1A:
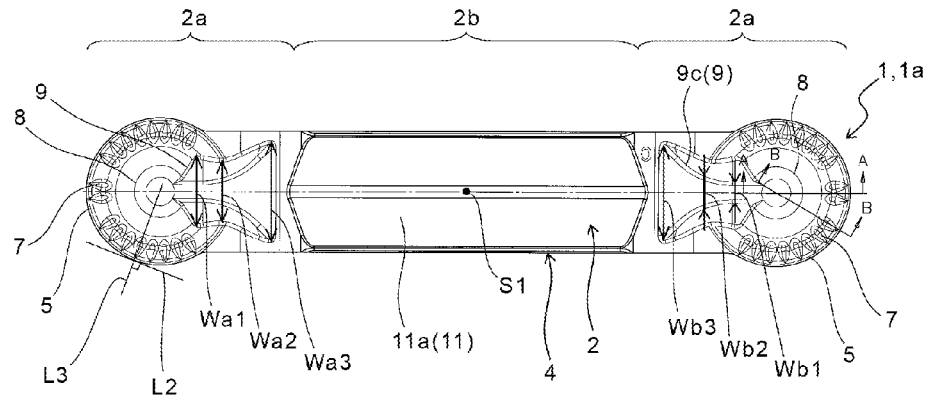
FIG. 1(a) is a plan view (top view) showing a cutting insert according to an embodiment of the present invention.

A cutting insert according to an embodiment of the present invention is described in details below with reference to FIGS. 1 to 3.

As shown in FIG. 1, the insert 1 generally includes an insert body 1a having an upper surface 2, a lower surface 3, a side surface 4 connected to each of the upper surface 2 and the lower surface 3, and a cutting edge 5 located at an intersection of the upper surface 2 and the side surface 4. In the present embodiment, both end parts corresponding to later-described cutting sections 2a in the upper surface 2 have a curve-like line or arc-like shape in a top view. The phrase "top view" hereinafter denotes a state that the insert 1 is viewed from the upper surface 2 unless otherwise stated.

The insert 1 may have, for example, a length (entire length) of 19.5 to 21.5 mm, a width (width of the cutting section) of 3.0 to 8.0 mm and a height of 4.0 to 6.0 mm.

The insert 1 is preferably comprised of one obtained by applying a film onto a sintered body, such as cemented carbide, cermet or ceramics. The film aims to improve the wear resistance of the insert 1. Examples of the film composition are titanium-based compounds, such as titanium carbide, titanium nitride and titanium carbon nitride, and alumina. The film may be comprised of at least one layer or a plurality of layers. Alternatively, the insert 1 may be comprised of a sintered body not covered with the film.

The insert 1 of the present embodiment is usable for a copying process, internal grooving process (internal grinding process) and cut-off process, and is suitably usable for the copying process among others. Individual components constituting the insert 1 are described sequentially below.

As shown in FIG. 1, the insert body 1a has the pair of cutting sections 2a and 2a on both ends in a longitudinal direction of the insert 1, and a fixing section 2b between the pair of cutting sections 2a and 2a.

Each of the cutting sections 2a is a main part for generating and discharging chips during a cutting process. A region of the cutting section 2a located closer to the front end of the insert 1 preferably has the curve-like line so as to correspond to the shape of the cutting edge 5. In the present embodiment, the region of the cutting section 2a located closer to the front end of the insert 1 has the arc-like shape.

As shown in FIG. 2, the cutting section 2a has on the upper surface 2 thereof a land 10 and a rake surface 6 that are located along the cutting edge 5, a middle breaker 8 located further inward than the rake surface 6, a plurality of protruded parts 7 located between the cutting edge 5 and the middle breaker 8, and a rear breaker 9 located closer to the fixing section 2b than the middle breaker 8. The term "inward" denotes a middle part of the cutting section 2a. In the present embodiment, the middle part of the cutting section 2a is located in the vicinity of the center of the middle breaker 8.

The fixing section 2b has a clamp surface 11 including an upper clamp 11a located on the upper surface 2 and a lower clamp surface 11b located on the lower surface 3. The fixing section 2b is fixed to a holder 21 by allowing the clamp surface 11 to be clamped from both the upper surface 2 and the lower surface 3 as described later. The fixing section 2b is located between the pair of cutting sections 2a and 2b, and has a rectangle-like shape in a top view.

In the present embodiment, the clamp surface 11 is located further inward than the cutting edge 5, and the upper clamp surface 11a is located at a higher position than the cutting edge 5. The phrase "higher position" denotes being present at a higher position in a thickness direction of the insert 1. That is, it means that the upper clamp surface 11a is present at a higher position relative to the cutting edge 5 when the insert 1 is placed stationarily on the lower surface 3 served as a seating surface. When it is difficult to place stationarily the insert 1 for itself by using the lower surface 3 as the seating surface, the insert 1 is attached to the holder 21 and is placed stationarily in this state. Then, the upper clamp surface 11a is required to be present at a higher position than the cutting edge 5. The concept of a later-described "lower position" is the opposite of the "higher position," and denotes being present at a lower position in the thickness direction of the insert 1.

The cutting edge 5 has a major role in cutting a workpiece 100, and is located at the intersection of the upper surface 2 and the side surface 4 as described above. In the insert 1 used for the copying process, at least a part of the cutting edge 5 has preferably the curve-like line in a top view as shown in FIG. 1, from the viewpoint of securing excellent chip disposal when the workpiece 100 is machined in various directions. In the present embodiment, the cutting edge 5 has the arc-like shape.

As described above, the upper surface 2 has the land 10, the rake surface 6, the middle breaker 8, the plurality of protruded parts 7 and the rear breaker 9 in the cutting section 2a, and also has the upper clamp surface 11a in the fixing section 2b. These individual components are specifically described below.

Figure 1B:
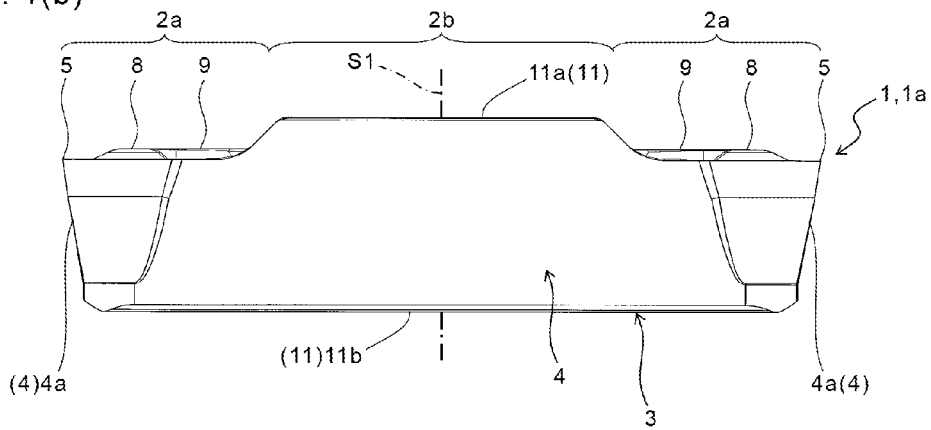
FIG. 1(b) is a side view thereof.
Figure 2A:
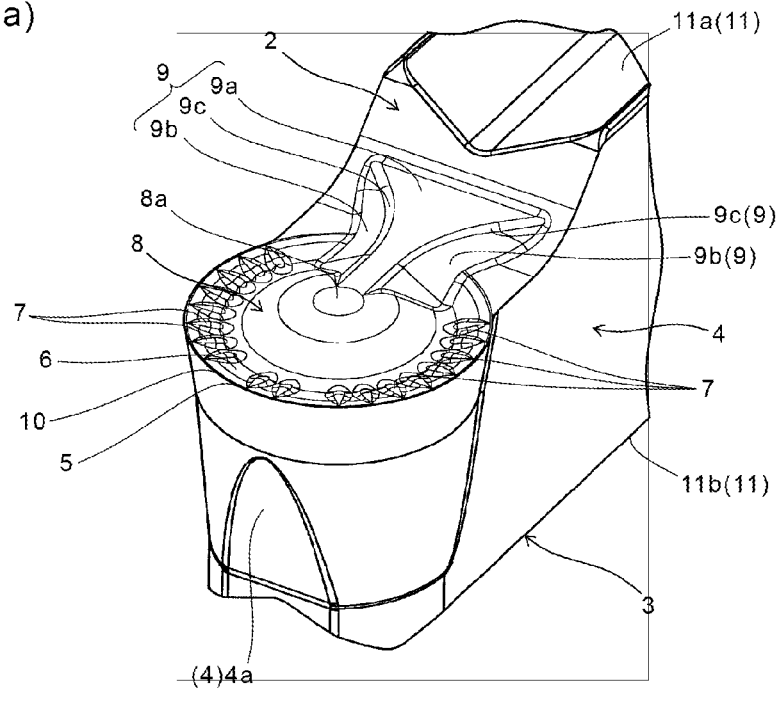
FIG. 2(a) is a partially enlarged perspective view showing a vicinity of a cutting section in the cutting insert in FIG. 1.
Figure 3A:
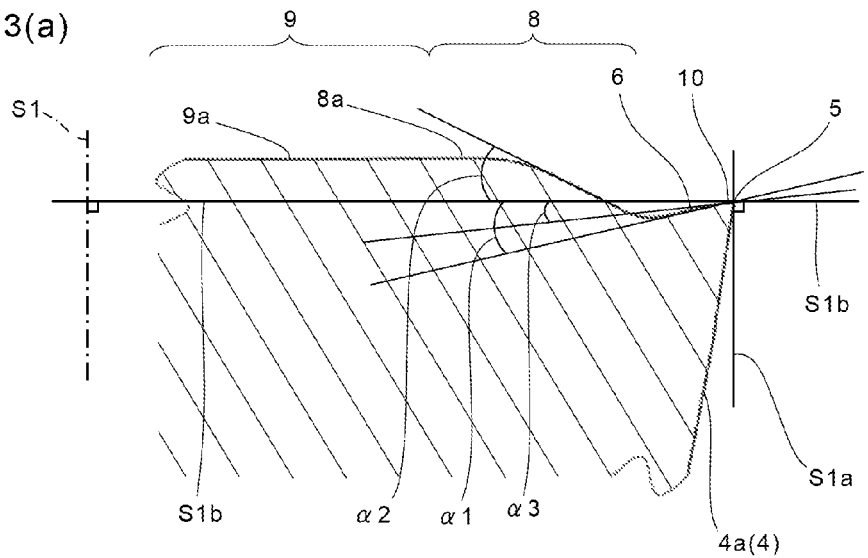
FIG. 3(a) is an enlarged sectional view taken along the line A-A in FIG. 1(a)

Firstly, the rake surface 6 is the surface along which the chips generated by the cutting edge 5 graze. As shown in FIGS. 2(a) and 3(a), the rake surface 6 is located along the cutting edge 5, and is inclined as going inward at an inclination angle α1 with respect to a reference plane S1b perpendicular to a central axis S1 extending between the upper surface 2 and the lower surface 3. The phrase "central axis S1" is the axis extending between the upper surface 2 and the lower surface 3 as shown in FIG. 1, and denotes the axis serving as a rotation axis when the insert 1 is rotated so that the positions of the cutting sections 2a and 2a are replaced with each other.

In the present embodiment, the rake surface 6 is inclined downward with respect to the reference plane S1b. The inclination angle α1 is preferably set at, for example, 5 to 20°. The phrase "inclination angle" denotes an angle at which an object is inclined with respect to the predetermined reference plane S1b. That is, a downward inclination, namely, a positive inclination is determined as being positive, and an upward inclination, namely, a negative inclination is determined as being negative.

Figure 3B:
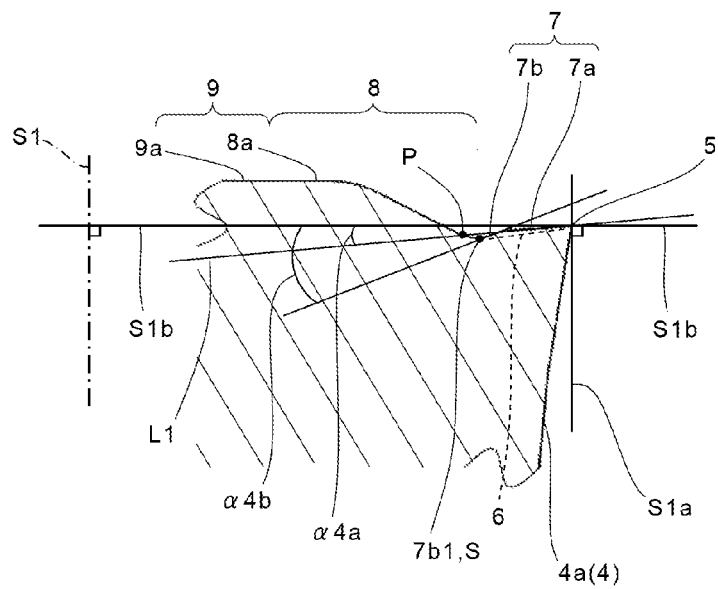
FIG. 3(b) is an enlarged sectional view taken along the line B-B in FIG. 1(a)

The cutting edge 5 is located at a higher position than the plurality of protruded parts 7 in a side cross-sectional view, namely, a sectional view that is parallel to the central axis S1 and is perpendicular to a tangent line L2 of the cutting edge 5 in a top view, as shown in FIG. 3(b). The phrase "side cross-sectional view" denotes a state that a cross section parallel to the central axis S1 of the insert 1 is viewed (seen through) from the side of the side surface 4.

Secondly, the land 10 has a role in mainly reinforcing the cutting edge 5, and is located at a narrow width region along the cutting edge 5 as shown in FIGS. 2 and 3(a). In the present embodiment, the land 10 is located continuously with the cutting edge 5 between the cutting edge 5 and the plurality of protruded parts 7, and is inclined as going inward at an inclination angle α3 with respect to the reference plane S1b as shown in FIG. 3(a). Hence, the inclination angle α3 of the land 10 and the inclination angle α1 of the rake surface 6 preferably satisfy a relationship of α3<α1. The land 10 is inclined downward as going inward. The inclination angle α3 is preferably set at, for example, 0 to 5°.

Thirdly, each of the plurality of protruded parts 7 is at least partially protruded with respect to the rake surface 6. As shown in FIGS. 1(a) and 2(a), the plurality of protruded parts 7 are located adjacent to each other along the cutting edge 5 between the cutting edge 5 and the middle breaker 8.

As shown in FIG. 3(b), each of the plurality of protruded parts 7 has a first surface 7a inclined as going inward at an inclination angle α4a with respect to the reference plane S1b, and a second surface 7b located further inward than the first surface 7a and inclined as going inward at an inclination angle α4b with respect to the reference plane S1b. In the present embodiment, the first surface 7a and the second surface 7b are continuous with each other. In other words, the second surface 7b is continuous with an inward side of the first surface 7a in a top view. The first surface 7a and the second surface 7b are respectively inclined downward as going inward. An end portion 7b1 of the second surface 7b closer to the middle breaker 8 is continuous with a portion S located at the lowest position in the middle breaker 8 which corresponds to a raised portion of the middle breaker 8.

In the present embodiment, the inclination angles α1 and α4a satisfy a relationship of α1>α4a. Further in the present embodiment, the inclination angles α4a and α4b satisfy a relationship of α4a<α4b. Thus, the inclination angle α4a of the first surface 7a of the protruded part 7 is smaller than the inclination angle α1 of the rake surface 6. Therefore, under cutting conditions that a depth of cut is relatively small, the first surface 7a of the protruded part 7 relatively functions as a so-called breaker surface from the relationship with the rake surface 6, and hence the chips generated by the cutting edge 5 can effectively be deformed in the vicinity of the cutting edge 5, thereby improving the ability to discharge the chips to the outside. Additionally, the inclination angle α4b of the second surface 7b of the protruded part 7 is larger than the inclination angle α4a of the first surface 7a of the protruded part 7. Therefore, when the chips after passing through the first surface 7a of the protruded part 7 are deformed by collision with the middle breaker 8 under cutting conditions that the depth of cut is relatively large, a recessed region between the middle breaker 8 and the second surface 7b of the protruded part 7 functions as a so-called clearance region (space) for the chips, thereby improving chip deforming action. At this time, the first surface 7a of the protruded part 7 exhibits the function of hardening the chips obtained under the cutting conditions that the depth of cut is large by forming streaks on the chips along a direction of movement (discharge), thereby facilitating the division of the chips when the chips collide with the middle breaker 8. Thus, the insert 1 of the present embodiment provides excellent chip discharge performance under the cutting conditions over a wide range of depths of cut.

Further, the inclination angle α1 of the rake surface 6 and the inclination angle α4b of the second surface 7b of the protruded part 7 preferably satisfy a relationship of α1<α4b. This ensures a large clearance region (space) for the chips, thereby further improving the chip deforming action.

As shown in FIG. 3(b), a virtual extension line L1 of the first surface 7a of each of the plurality of protruded parts 7 intersects the middle breaker 8 at an intersection P that is a portion located at a lower position than a top 8a of the middle breaker 8 in a side cross-sectional view, namely, a sectional view that is parallel to the central axis S1 and is perpendicular to the tangent line L2 of the cutting edge 5 in a top view. Consequently, the chips after passing through the first surfaces 7a of the plurality of protruded parts 7 are deformed by collision with a portion located at a higher position than the intersection P in the middle breaker 8.

In the present embodiment, the land 10 is located between the cutting edge 5 and the plurality of protruded parts 7 as described above, and the plurality of protruded parts 7 are continuous with the land 10. An inclination angle α3 of the land 10 and the inclination angle α4a of the first surfaces 7a of the protruded parts 7 have a relationship of α3=α4a. Therefore, the shape formed between the first surfaces 7a of the plurality of protruded parts 7 and the land 10 is a straight-like line in a side cross-sectional view. The shape formed between the land 10 and the protruded parts 7 may be non-straight-like line shape by disposing another configuration therebetween, while having the relationship of α3=α4a.

Figure 2B:
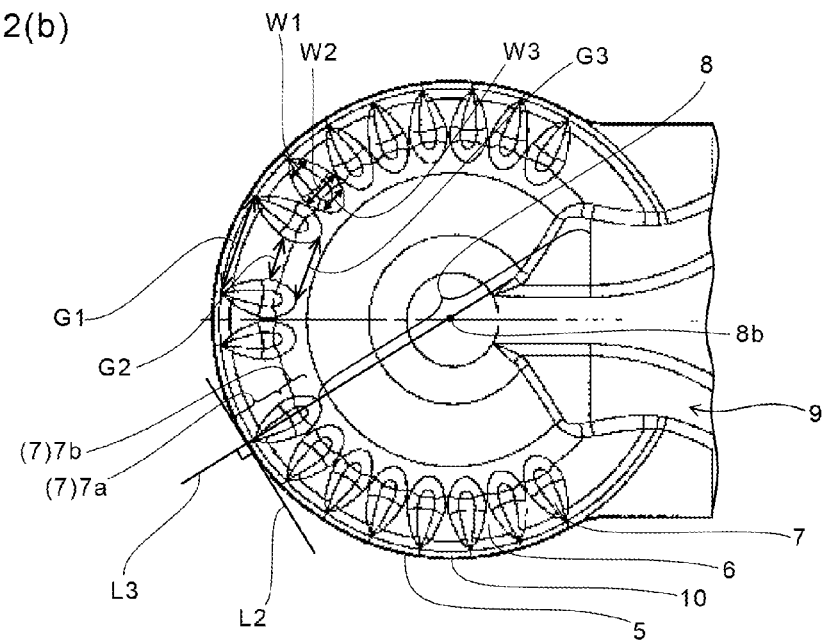
FIG. 2(b) is a partially enlarged plan view (top view) of the cutting section.

As shown in FIG. 2(b), the first surface 7a has a larger width as going inward from the cutting edge 5 in a top view. In other words, the distance between the adjacent protruded parts 7 and 7 is decreased as going inward from the cutting edge 5. Consequently, when the cutting edge 5 cuts the workpiece 100, namely, when the cutting edge 5 is contacted against the workpiece 100 and chips are generated, the width of each protruded part 7 is increased as the chip generation proceeds, while reducing chatter vibration by suppressing cutting resistance owing to the narrow width portion of the protruded part 7. Therefore, the chips can be hardened to allow the chips to effectively be discharged. Additionally, the chips, which are generated by the arc-like shaped cutting edge 5 and are moved in various directions, can efficiently be collided with the protruded parts 7, thereby effectively deforming the chips.

The second surface 7b has a smaller width as going inward from the cutting edge 5 in a top view. This ensures the so-called large clearance region (space) for the chips between the middle breaker 8 and the second surfaces 7b of the protruded parts 7, particularly the clearance region in the width direction. It is therefore capable of enhancing the chip discharge performance under the cutting conditions that the depth of cut is relatively large.

Hereat, the lengths of the first surface 7a and the second surface 7b are described. The length of the first surface 7a is larger than the length of the second surface 7b in a direction from the cutting edge 5 to the center of the middle breaker 8. Accordingly, the width of the first surface 7a can gently be widened as going inward from the cutting edge 5, thereby improving chip lifting action while reducing the cutting resistance.

In the present embodiment, as shown in FIG. 2(b), a width W1 of each of the protruded parts 7 located closer to the cutting edge 5, a width W2 of the protruded part 7 in a connection part of the first surface 7a and the second surface 7b, and a width W3 of the protruded part 7 located closer to the middle breaker 8 satisfy relationships of W1<W2, W2>W3 and W1<W3. Specifically, in the present embodiment, the protruded part 7 is narrowed toward the cutting edge 5, and the end portion thereof has a tapered-like shape. The end portion of the protruded part 7 closer to the cutting edge 5 has substantially zero width. This permits an effective action on the cutting resistance. A region of the first surface 7a closer to the second surface 7b in the protruded part 7 has the largest width, and hence the chip deforming action in the vicinity of the cutting edge 5 can be exhibited effectively.

Gaps between the adjacent protruded parts 7 and 7, specifically, a gap G1 therebetween on the side of the cutting edge 5, a gap G2 therebetween in the connection part of the first surface 7a and the second surface 7b, and a gap G3 therebetween on the side of the middle breaker 8 satisfy relationships of G1>G2, G2<G3 and G1>G3. In the present embodiment, the gap therebetween reaches its maximum value on the side of the cutting edge 5.

As shown in FIGS. 1(a) and 2(b), a longitudinal direction of each of the plurality of protruded parts 7 is perpendicular to the tangent line L2 at the closest portion in the cutting edge 5 in a top view. Further, as shown in FIGS. 1(a) and 2(b), a virtual extension line L3 in the longitudinal direction of each of the plurality of protruded parts 7 passes through a center 8b of the middle breaker 8 in a top view. Accordingly, the movement direction of the chips and the longitudinal direction of the protruded parts 7 can coincide with each other. Therefore, the protruded parts 7 can effectively be used to effectively deform and discharge the chips irrespective of the position of the cutting edge 5 used for cutting. Similarly, the function of the middle breaker 8 can effectively be exhibited irrespective of the position of the cutting edge 5 used for cutting by configuring so that the raised portion of the middle breaker 8 is also perpendicular to the tangent line L2 of the cutting edge 5. These effects become pronounced when the cutting edge 5 has the arc-like shape.

As shown in FIGS. 1(a) and 2(a), the two protruded parts 7 and 7 adjacent to each other among the plurality of protruded parts 7 are contacted with each other with no space therebetween. This makes it easier for the protruded parts 7 to form streaks on the chips generated by the cutting edge 5 under the cutting conditions that the depth of cutting is large. In this state, the chips collide with the middle breaker 8, and consequently the chip deforming and dividing actions can effectively be exhibited. The two protruded parts 7 and 7 are contacted with each other at their respective portions in the longitudinal direction thereof closer to the middle breaker 8 than the middle part thereof.

In the region of each of the cutting sections 2a closer to the front end of the insert 1, the two adjacent protruded parts 7 and 7 are spaced apart from each other. In the present embodiment, the two adjacent protruded parts 7 and 7 are located apart from each other by a distance larger than at least one width of each protruded part 7 in the region of the cutting section 2a closer to the front end of the insert 1. Consequently, the cutting resistance at the front end can be reduced, and it becomes easier to lead the chips into the space between the two adjacent protruded parts 7 and 7 under the cutting conditions that the depth of cut is small, thereby permitting an effective exhibition of the breaker function of the protruded parts 7. This is suitable, for example, when a traversing process is carried out under small depth of cut conditions, or when a small angle taper turning process is carried out. As used herein, the phrase "one width of the protruded part 7" denotes a maximum dimension among the dimensions of the protruded part 7 in a direction perpendicular to the longitudinal direction of the protruded part 7.

Fourthly, the middle breaker 8 has a role in causing collision and division of the chips grazed along the rake surface 6, or a role in discharging the chips to the outside. As shown in FIGS. 2(a) and 3, the middle breaker 8 is located further inward than the rake surface 6 and is inclined upward as going inward at an inclination angle α2 with respect to the reference plane S1b. The inclination angle α2 is preferably set at, for example, −15 to −35°. In the present embodiment, the top 8a of the middle breaker 8 is located at a higher position than the plurality of protruded parts 7 in a side cross-sectional view, namely, in a sectional view that is parallel to the central axis S1 and is perpendicular to the tangent line L2 of the cutting edge 5 in a top view, as shown in FIG. 3(b). The top 8a of the middle breaker 8 has a plane-like shape.

The cutting edge 5 is preferably located at a lower position than the top 8a of the middle breaker 8 in a side view. Thereby, the chips can be relatively largely deformed and discharged by the protruded parts 7 located in the vicinity of the cutting edge 5 without depending on the middle breaker 8, even when it is difficult to perform chip disposal because chips are soft or hard and run on the middle breaker 8, for example, under machining conditions of high cutting speed or high feed rate.

Fifthly, the rear breaker 9 has a role in assisting the chip discharge performance by the middle breaker 8. As shown in FIGS. 2(a) and 3, the rear breaker 9 is located closer to the central axis S1 of the insert 1 than the middle breaker 8 in a top view, and is continuous with the middle breaker 8. That is, in addition to the fact that the chips can be discharged by the rear breaker 9 alone, some of the chips discharged through the middle breaker 8 pass near the rear breaker 9, thereby stabilizing the flow of chips.

A top 9a of the rear breaker 9 has a plane-like shape. The top 8a of the middle breaker 8 and the top 9a of the rear breaker 9 have the same height.

As shown in FIG. 2(a), the rear breaker 9 has a pair of raised surfaces 9b and 9b which are continuous with both sides of the top 9a of the rear breaker 9, and are inclined upward as going toward the top 9a on the basis of a direction from the cutting section 2a to the fixing section 2b, namely, the longitudinal direction of the insert 1.

A pair of ridge line parts 9c and 9c located at an intersection of the pair of raised surfaces 9b and 9b and the top 9a extend outward as going from the cutting section 2a to the fixing section 2b. That is, as shown in FIG. 1(a), distances between the pair of ridge line parts 9c and 9c of the rear breaker 9, specifically, a distance Wb1 therebetween on the side of the middle breaker 8 (a distance of a straight line connecting the raised portion of the middle breaker 8), a distance Wb2 therebetween at the connection part (a partial distance of a straight line connecting between the end of the cutting edge), and a distance Wb3 therebetween in the end closer to the fixing section 2b satisfy a relationship of Wb1<Wb2<Wb3.

At least a part of the rear breaker 9 has a larger width as going from the cutting section 2a to the fixing section 2b in a top view. That is, as shown in FIG. 1(a), a width Wa1 of the rear breaker 9 closer to the middle breaker 8 (a partial distance of a straight line connecting the raised portion of the middle breaker 8), a width Wa1 thereof at the connection part (a distance of a straight line connecting between the ends of the cutting edge), and a width Wa3 thereof at the end closer to the fixing section 2b satisfy a relationship of Wa2<Wa3. In the present embodiment, a relationship of Wa1>Wa2 is satisfied. This further stabilizes the flow of chips, and enhances the discharge of chips to the outside (sidewise), thereby reducing damage to the insert 1 and the holder 21.

Figure 1C:
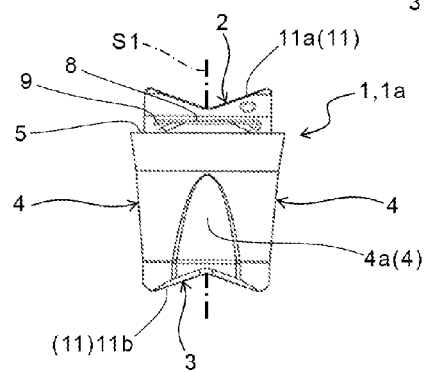
FIG. 1(c) is a front view (front end view) thereof.

Sixthly, the upper clamp surface 11a is located at the fixing section 2b as described above, and a middle part of the upper clamp surface 11a is recessed to form a substantially V-shape in a front end view, as shown in FIG. 1(c). The phrase "front end view" denotes hereinafter a state that the insert 1 is viewed from the front end unless a special explanation is required.

The lower surface 3 is located opposite to the upper surface 2, and has a lower clamp surface 11b whose middle part is recessed to form a substantially V-shape in a front end view, as shown in FIG. 1(c).

As stated earlier, the side surface 4 is connected to the upper surface 2 and the lower surface 3 as shown in FIG. 1(c) or the like. The side surface 4 has a flank surface 4a inclined inward from the upper surface 2 to the lower surface 3 with respect to the reference plane S1a parallel to the central axis S1 in a side view, as shown in FIGS. 1(b) and 3.

<Cutting Tool>

Figure 4A:
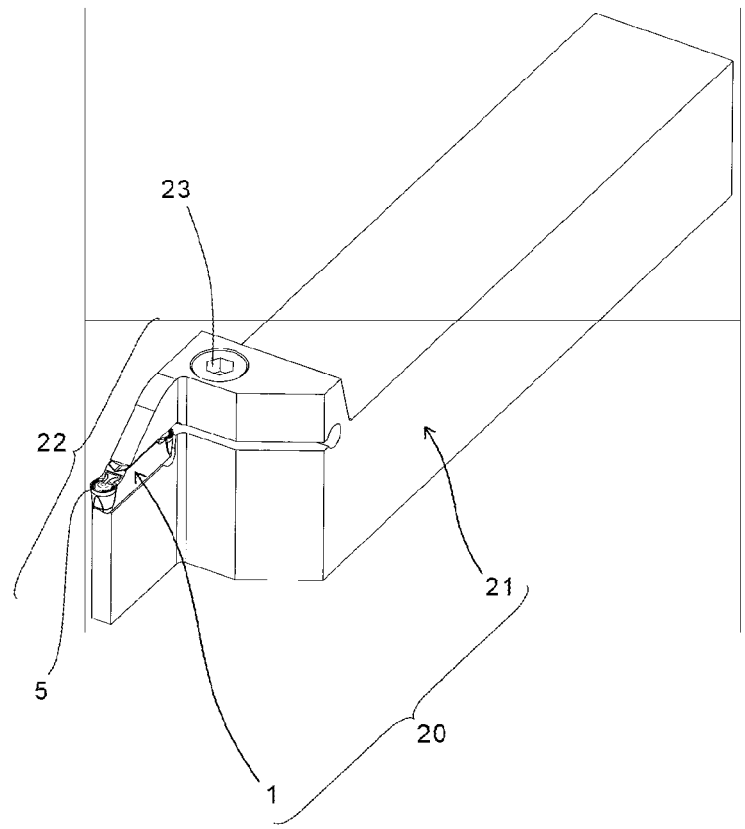
FIG. 4(a) is a perspective view showing a cutting tool according to an embodiment of the present invention.
Figure 4B:
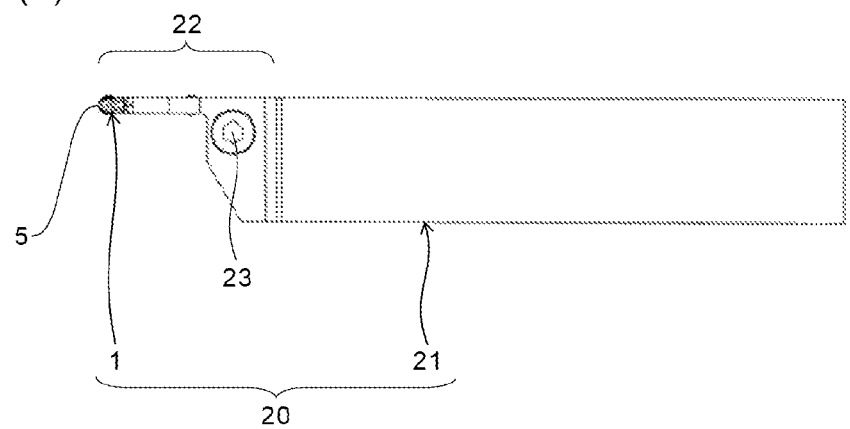
FIG. 4(b) is a plan view thereof.

Next, a cutting tool according to an embodiment of the present invention is described in details with reference to FIG. 4. The cutting tool 20 of the present embodiment includes the insert 1 and the holder 21 configured to attach the insert 1 to a front end thereof.

The insert 1 is attached to the holder 21 in a state that the cutting edge 5 protrudes from the front end of the holder 21. In the present embodiment, when the insert 1 is attached to the holder 21, a clamp mechanism 22 adjustable with a screw 23 exerts a clamping force that is obtained by pinching from above and below the clamp surface 11 of the insert 1 by using the front end of the holder 21. More specifically, a restraining force is adjustable with the screw 23 disposed at the front end of the holder 21, and the insert 1 is restrained by pressing it from above.

Instead of the foregoing attachment method of the present embodiment, the insert 1 may be attached to the holder 21 by another method. For example, a hole is opened in the insert 1, and the insert 1 is constrained from an inner wall of the hole of the insert 1 with the principle of leverage of a substantially L-shaped lever.

<Method of Manufacturing Machined Product>

Figure 5:
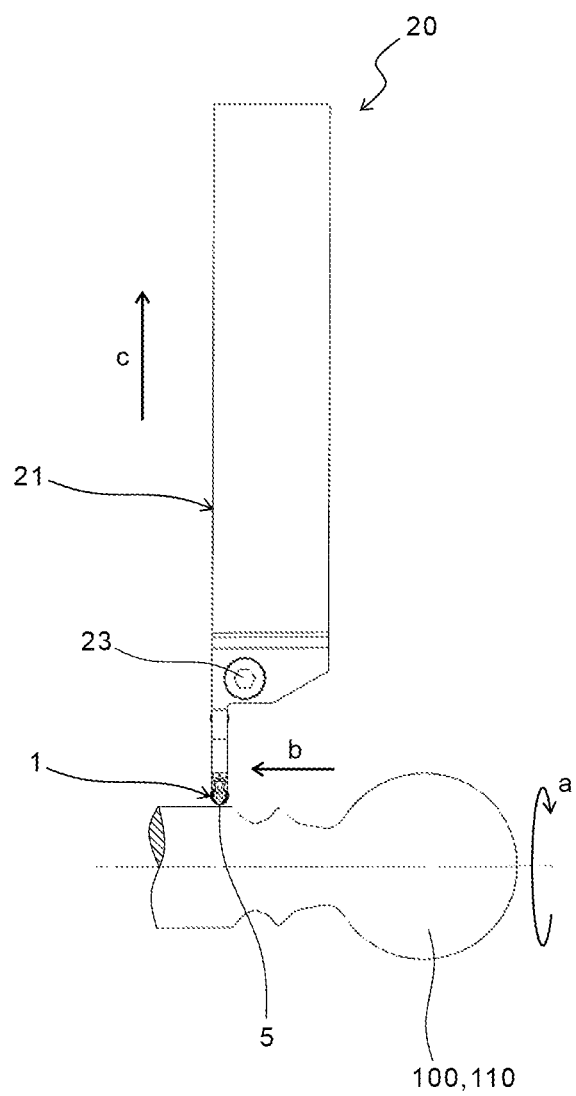
FIG. 5 is a schematic explanatory diagram showing a method of manufacturing a machined product according to an embodiment of the present invention.

Next, a method of manufacturing a machined product according to an embodiment of the present invention is described below with reference to FIG. 5, by illustrating the case of performing the copying process with the cutting tool 20.

The method of manufacturing the machined product according to the present embodiment by using the cutting tool 20 includes the following steps (i) to (iii).

(i) Rotating the workpiece 100 in a direction of an arrow a;

(ii) Bringing the workpiece 100 being rotated and the cutting edge 5 of the cutting tool 20 into contact with each other by moving the cutting tool 20 along the shape of the workpiece 100 in a direction of an arrow b, thereby cutting the workpiece 100 (the copying process); and (iii) Separating the cutting tool 20 from the workpiece 100 by moving the cutting tool 20 in a direction of an arrow c.

A desired machined product 110 can be obtained by cutting the workpiece 100 through the foregoing manufacturing steps.

In the step (i), the workpiece 100 and the cutting tool 20 may be brought close to each other. For example, the workpiece 100 may be brought close to the cutting tool 20. Similarly, in the step (iii), the workpiece 100 and the cutting tool 20 may be separated from each other. For example, the workpiece 100 may be separated from the cutting tool 20.

When the cutting process is continuously performed, it is required to repeat the step of bringing the cutting edge 5 of the cutting tool 20 into contact against different portions of the workpiece 100, while keeping the rotation of the workpiece 100.

The insert 1 is provided with the two cutting edges as described above. Therefore, when one of the cutting edges 5 being used is worn, the other cutting edge 5 not yet used may be used.

It is to be understood that the present invention is not limited to the foregoing embodiment, and various changes and modifications can be made therein without departing from the spirit or scope of the present invention.

Figure 6A:
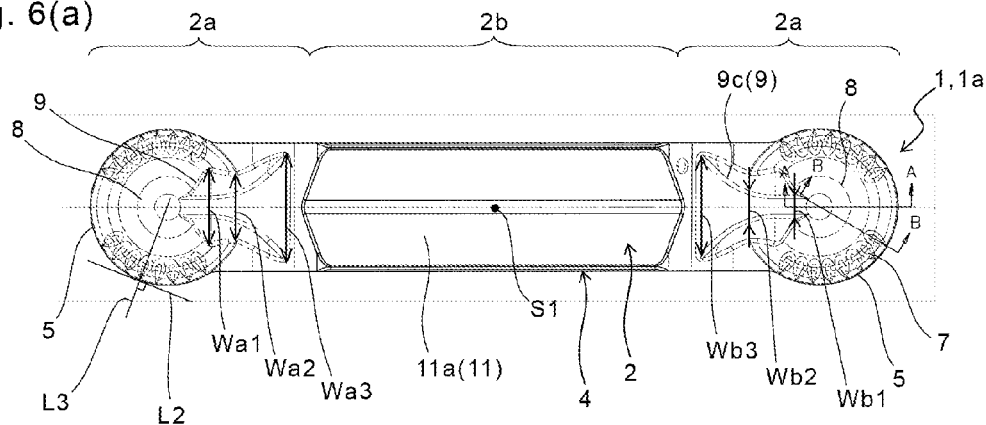
FIG. 6(a) is a plan view (top view) showing a cutting insert according to other embodiment of the present invention.
Figure 6B:
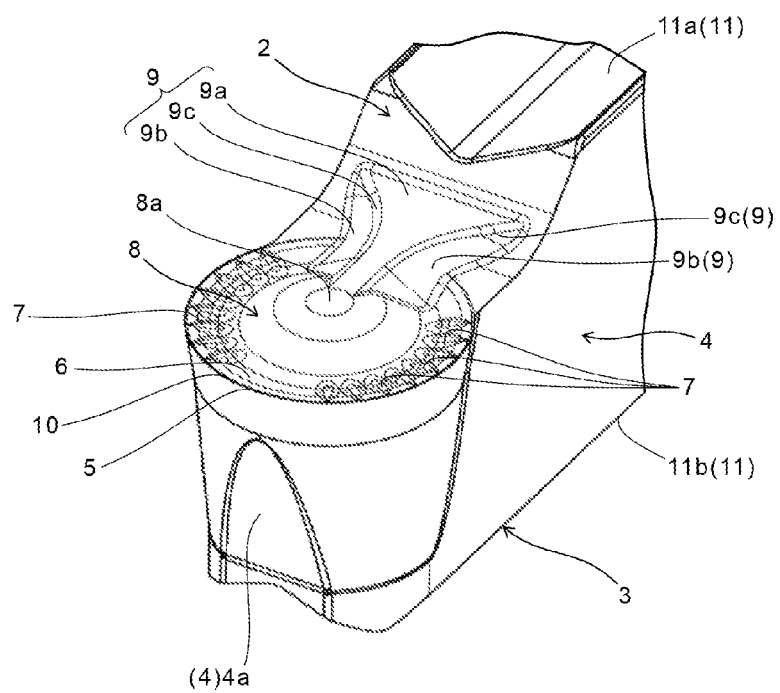
FIG. 6(b) is a partially enlarged perspective view showing a vicinity of a cutting section thereof.

For example, in the foregoing embodiment, the plurality of protruded parts 7 are disposed except for the partial region of the cutting section 2a located closer to the front end of the insert 1. As another example, as shown in FIG. 6, the plurality of protruded parts 7 may be disposed except for the entire region of the foregoing front end. This configuration allows the cutting resistance to be effectively reduced when performing a process of forming a groove by using the front end. As yet another example, the plurality of protruded parts 7 may be disposed over the entire region of the cutting edge 5. In this case, the distance between the two adjacent protruded parts 7 and 7 is set to be wide at the front end and narrow at other portions while maintaining a connection state between the two adjacent protruded parts 7 and 7. This configuration also allows the cutting resistance to be effectively reduced when performing the process of forming a groove by using the front end. Other configurations are similar to those of the insert 1 according to the foregoing embodiment.

In the foregoing embodiment, each of the protruded parts 7 is narrowed toward the cutting edge 5, and has a sharply pointed front end. Alternatively, the protruded part 7 may have a circle-like shape in a top view. In this case, the longitudinal direction of the protruded part 7 is a direction perpendicular to the tangent line L2 at the closest region in the cutting edge 5. Other configurations are similar to those of the insert 1 according to the foregoing embodiment.

In the foregoing embodiment, the two protruded parts 7 and 7 adjacent to each other among the plurality of protruded parts 7 are contacted with each other. Alternatively, the two adjacent protruded parts 7 and 7 may be spaced apart a predetermined distance. Owing to this configuration, the cutting resistance at the front end can be reduced, and it becomes easier to lead the chips into the space between the two adjacent protruded parts 7 and 7 under the cutting conditions that the depth of cut is small, thereby permitting an effective exhibition of the breaker function of the protruded parts 7. For example, when performing a so-called taper machining under the cutting conditions that the depth of cut is small, namely, machining a workpiece at a certain angle with respect to the rotation axis of the workpiece in a turning process, the chips led into the space between the protruded parts 7 and 7 are bent and controlled in such a manner that the chips are lifted along the side surfaces of the protruded parts 7. Particularly, the bending of the chips due to lifting up is enhanced by leading the chips into the space, thereby improving the chip discharge performance. Other configurations are similar to those of the insert 1 according to the foregoing embodiment.

Figure 7A:
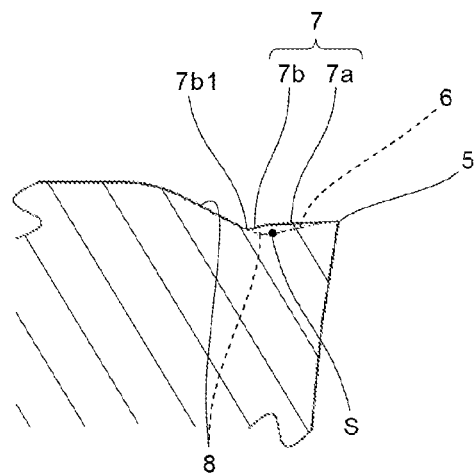
FIGS. 7(a) to 7(c) are diagrams showing examples of various modifications of the cutting insert in FIG. 1, specifically enlarged sectional views taken along the line B-B in FIG. 1.
Figure 7B:
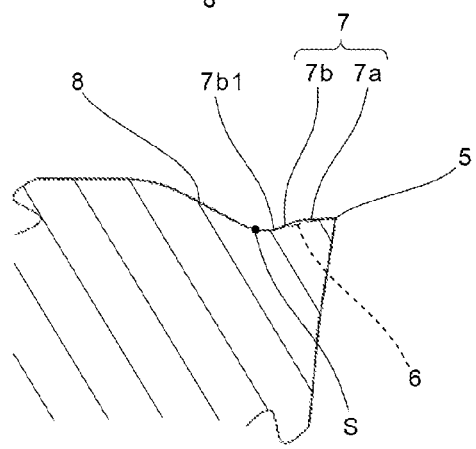
Figure 7C:
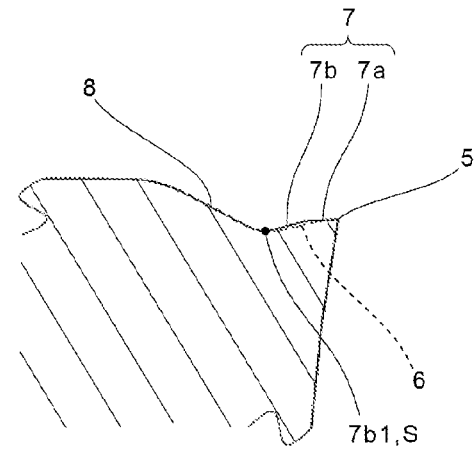

In the foregoing embodiment, the end portion 7b1 of the second surface 7b of the protruded part 7 located closer to the middle breaker 8 is continuous with the portion S located at the lowest position in the middle breaker 8 corresponding to the raised portion of the middle breaker 8, as shown in FIG. 3(*b*). As another example, the end portion 7b1 may be located further inward than the portion S, as shown in FIG. 7(*a*). As yet another example, the end portion 7b 1 may be located closer to the cutting edge 5 than the portion S, as shown in FIG. 7(*b*). In the former case, the end portion 71b1 is continuous with a higher portion than the portion S corresponding to the raised portion of the middle breaker 8. In the latter case, the end portion 7b1 is continuous with the rake surface 6. Both cases provide an equivalent effect to the foregoing embodiment. Further in the former case, it is relatively easy to ensure a larger first surface 7a of the protruded part 7. Therefore, the function of the protruded part 7 as the breaker surface can be enhanced, thereby improving the chip discharge performance under the cutting condition that the depth of cut is relatively small. The latter case can ensure a so-called large flank region (space) for chips that is a recessed region located between the middle breaker 8 and the second surface 7b of the protruded part 7, thereby improving the chip discharge performance under the cutting conditions that the depth of cut is relatively large. Other configurations are similar to those of the insert 1 according to the foregoing embodiment.

In the foregoing embodiment, the length of the first surface 7a is larger than the length of the second surface 7b in the protruded part 7. Alternatively, as shown in FIG. 7(*c*), the length of the first surface 7a may be smaller than the length of the second surface 7b. This configuration can ensure a larger flank region (space) for chips that is the recessed region located between the middle breaker 8 and the second surface 7b of the protruded part 7, thereby further improving the chip deforming action. In FIG. 7(*c*), the inclination angle $\alpha 4a$ of the first surface 7a is the same as that in the foregoing embodiment, and the inclination angle $\alpha 4b$ of the second surface 7b is set to be smaller than that in the foregoing embodiment. Thereby, the end portion 7b1 of the second surface 7b located closer to the middle breaker 8 is continuous with the portion S located at the lowest position in the middle breaker 8 corresponding to the raised portion of the middle breaker 8.

Other configurations are similar to those of the insert 1 according to the foregoing embodiment.

In the foregoing embodiment, the first surface 7a and the second surface 7b of the protruded part 7 have the straight-like line in the side cross-sectional view, namely, in the sectional view that is taken along the longitudinal direction of the protruded part 7 and is parallel to the central axis S1. Alternatively, at least one of the first surface 7a and the second surface 7b may have a curve-like line. This configuration allows the chips to be discharged inward while allowing the chips to smoothly contact with the protruded parts 7, thereby improving the life of the protruded parts 7. Other configurations are similar to those of the insert 1 according to the foregoing embodiment.

Further, the inclination angle α4b of the second surface 7b of the protruded part 7 may be set to be increased as going inward in the sectional view that is taken along the longitudinal direction of the protruded part 7 and is parallel to the central axis S1. This configuration can ensure a larger flank region (space) for chips that is the recessed region located between the middle breaker 8 and the second surface 7b of the protruded part 7, thereby further improving the chip deforming action. Other configurations are similar to those of the insert 1 according to the foregoing embodiment.

In the foregoing embodiment, the first surface 7a is inclined downward as going inward and the second surface 7b is inclined downward as going inward in the protruded part 7. Alternatively, the first surface 7a may be inclined upward as going inward, and the second surface 7b may be inclined downward as going inward. Owing to this configuration, the strength of the cutting edge 5 can be reinforced by the first surface 7a, thereby reducing damage to the cutting edge 5. In this case, the effect of reinforcing the strength of the cutting edge 5 can be more effectively achieved by allowing the land 10 to also be inclined upward as going inward. Other configurations are similar to those of the insert 1 according to the foregoing embodiment.

In the foregoing embodiment, the land 10 is disposed along the cutting edge 5 on the upper surface 2. Alternatively, the land 10 may not be disposed there. In this case, the plurality of protruded parts 7 is respectively required to be continuous with the cutting edge 5. This configuration can reduce the cutting resistance. Other configurations are similar to those of the insert 1 according to the foregoing embodiment.

In the foregoing embodiment, the top 8a of the middle breaker 8 and the top 9a of the rear breaker 9 have the plane-like shape. Alternatively, at least one of the tops 8a and 9a may have such a semi-spherical surface shape that is located at a higher position as going toward the center of the top 8a or 9a. This achieves a smoother chip discharge flow. Other configurations are similar to those of the insert 1 according to the foregoing embodiment.

Figure 8A:
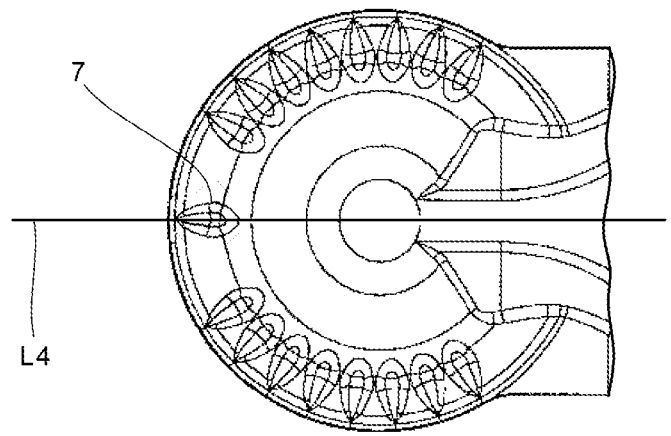
FIGS. 8(a) and 8(b) are diagrams showing examples of various modifications of the cutting insert in FIG. 1, specifically partially enlarged plan views (top views), each showing a cutting section thereof.

As shown in FIG. 8(a), at least one of the plurality of protruded parts 7 may be located closer to the front end of the cutting section 2a, and at least a part of this single protruded part 7 may be located on a reference line L4 perpendicular to the central axis S1. This configuration allows chips to efficiently collide with this single protruded part 7, thereby improving the chip discharge performance under the cutting conditions that the depth of cut is relatively small. Other configurations are similar to those of the insert 1 according to the foregoing embodiment.

Figure 8B:
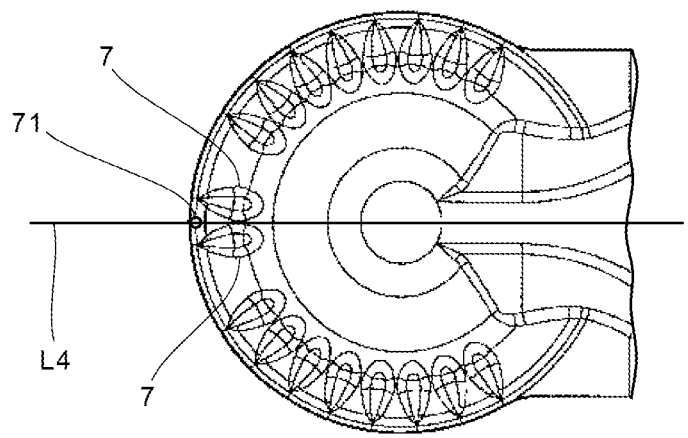

As shown in FIG. 8(b), a small protruded part 71 smaller than the protruded part 7 may be further included. Specifically, the two protruded parts 7 and 7 adjacent to each other among the plurality of protruded parts 7 are located closer to the front end of the cutting section 2a, and are located across the reference line L4 in a top view. A region of the upper surface 2 located at the cutting section 2a further includes the small protruded part 71 which is located between the two protruded parts 7 and 7 and closer to the front end than the two protruded parts 7 and 7, and is at least partially located on the reference line L4 in a top view. The small protruded part 71 is smaller than the two protruded parts 7 and 7. Owing to this configuration, the chip discharge performance can be ensured by allowing generated chips to collide with the small protruded part 71 without depending on the two protruded parts 7 and 7, even under the cutting conditions that the depth of cut is small. In this embodiment, the small protruded part 71 has a circle-like shape in a top view. Other configurations are similar to those of the insert 1 according to the foregoing embodiment.

What is claimed is:

1. A cutting insert, comprising:
  an insert body comprising an upper surface, a lower surface, a side surface connected to each of the upper surface and the lower surface, and a cutting edge located at an intersection of the upper surface and the side surface, the insert body being divided into a cutting section and a fixing section, wherein
  a region of the upper surface located at the cutting section comprises
    a rake surface which is located further inward than the cutting edge and is inclined as going inward at an inclination angle α1 with respect to a reference plane perpendicular to a central axis extending between the upper surface and the lower surface, and
    a plurality of protruded parts arranged along the cutting edge,
      each of the plurality of protruded parts comprising a first surface which is inclined as going inward at an inclination angle α4a with respect to the reference plane and has a larger width as going inward in a top view, the inclination angles α1 and α4a satisfying a relationship of α1>α4a,
    the plurality of protruded parts comprise
      a plurality of second protruded parts and
      two first protruded parts which are located closer to a front end of the cutting section than the second protruded parts,
    the two first protruded parts contact each other,
    two of the second protruded parts adjacent to each other of the plurality of second protruded parts contact each other, and
    the first protruded parts and the second protruded parts are spaced apart from each other.

2. A cutting insert, comprising:
  an insert body comprising an upper surface, a lower surface, a side surface connected to each of the upper surface and the lower surface, and a cutting edge located at an intersection of the upper surface and the side surface, the insert body being divided into a cutting section and a fixing section, wherein
  a region of the upper surface located at the cutting section comprises
    a rake surface which is located further inward than the cutting edge and is inclined as going inward at an inclination angle α1 with respect to a reference plane perpendicular to a central axis extending between the upper surface and the lower surface, and
    a plurality of protruded parts arranged along the cutting edge,
      each of the plurality of protruded parts comprising a first surface which is inclined as going inward at an inclination angle α4a with respect to the reference plane and has a larger width as going inward in a top view, the inclination angles α1 and α4a satisfying a relationship of α1>α4a, the plurality of protruded parts comprise a plurality of second protruded parts and two first protruded parts which are located closer to a front end of the cutting section than the second protruded parts, and the two first protruded parts contact each other at a further inward portion than a middle portion in a longitudinal direction of the two first protruded parts.

3. A cutting insert, comprising:
an insert body comprising an upper surface, a lower surface, a side surface connected to each of the upper surface and the lower surface, and a cutting edge located at an intersection of the upper surface and the side surface, the insert body being divided into a cutting section and a fixing section, wherein
a region of the upper surface located at the cutting section comprises
a rake surface which is located further inward than the cutting edge and is inclined as going inward at an inclination angle α1 with respect to a reference plane perpendicular to a central axis extending between the upper surface and the lower surface, and
a plurality of protruded parts arranged along the cutting edge,
each of the plurality of protruded parts comprising a first surface which is inclined as going inward at an inclination angle α4a with respect to the reference plane and has a larger width as going inward in a top view, the inclination angles α1 and α4a satisfying a relationship of α1>α4a, and each of the plurality of protruded parts extend to and contact the cutting edge.

4. The cutting insert according to claim 3, wherein each of the plurality of protruded parts further comprises a second surface which is continuous with an inward side of the first surface in a top view and is inclined at an inclination angle α4b as going inward with respect to the reference plane, the inclination angles α4a and α4b satisfying a relationship of α4a<α4b.

5. The cutting insert according to claim 4, wherein the inclination angles α1 and α4b satisfy a relationship of α1<α4b.

6. The cutting insert according to claim 4, wherein the second surface has a smaller width as going inward in a top view.

7. The cutting insert according to claim 3, wherein the plurality of protruded parts comprise a plurality of second protruded parts and two first protruded parts which are located closer to a front end of the cutting section than the second protruded parts, and the two first protruded parts contact each other.

8. The cutting insert according to claim 3, wherein
the plurality of protruded parts comprise a plurality of second protruded parts and two first protruded parts which are located closer to a front end of the cutting section than the second protruded parts, and
the two first protruded parts are spaced apart from each other.

9. The cutting insert according to claim 8, wherein the two first protruded parts are spaced apart from each other by a distance larger than at least one width of the two first protruded parts.

10. The cutting insert according to claim 4, wherein the inclination angle α4b increases as going inward in a sectional view that is taken along the longitudinal direction of the protruded parts and is parallel to the central axis.

11. The cutting insert according to claim 4, wherein the first surface and the second surface are inclined downward as going inward.

12. The cutting insert according to claim 3, wherein the region of the upper surface located at the cutting section further comprises a land which is located continuously with the cutting edge between the cutting edge and the plurality of protruded parts and is inclined as going inward at an inclination angle α3 with respect to the reference plane.

13. The cutting insert according to claim 12, wherein each of the plurality of protruded parts is continuous with the land.

14. The cutting insert according to claim 3, wherein a longitudinal direction of each of the plurality of protruded parts is perpendicular to a tangent line at a closest region in the cutting edge in a top view.

15. The cutting insert according to claim 3, wherein the region of the upper surface located at the cutting section further comprises a middle breaker which is located further inward than the rake surface and is inclined upward as going inward at an inclination angle α2 with respect to the reference plane.

16. The cutting insert according to claim 3, wherein the cutting edge is located at a higher position than the plurality of protruded parts in a sectional view that is parallel to the central axis and is perpendicular to a tangent line of the cutting edge in a top view.

17. The cutting insert according to claim 3, wherein
the plurality of protruded parts comprise a plurality of second protruded parts and at least one first protruded part which is located closer to a front end of the cutting section than the second protruded parts, and
the first protruded part is at least partially located on a reference line perpendicular to the central axis in a top view.

18. The cutting insert according to claim 3, wherein
the plurality of protruded parts comprise a plurality of second protruded parts and two first protruded parts which are located closer to a front end of the cutting section than the second protruded parts,
the first protruded parts are located on both sides of a reference line perpendicular to the central axis,
the region of the upper surface located at the cutting section further comprises a small protruded part located between the two first protruded parts and closer to a front end than the two first protruded parts, the small protruded part being at least partially located on the reference line and being smaller than the two first protruded parts in a top view.

19. A cutting tool, comprising:
a cutting insert according to claim 3; and
a holder configured to attach the cutting insert to a front end thereof.

20. A method of manufacturing a machined product, comprising:
rotating a workpiece;
bringing the workpiece being rotated and the cutting edge of the cutting tool according to claim 19 into contact with each other; and
separating the workpiece and the cutting tool from each other.

* * * * *